United States Patent [19]

Cover

[11] Patent Number: 4,700,521
[45] Date of Patent: Oct. 20, 1987

[54] MULTILAYERED INSULATION BATT FOR BUILDING STRUCTURES

[76] Inventor: Craig H. Cover, 344 Wrights Rd., Newtown, Pa. 18940

[21] Appl. No.: 856,197

[22] Filed: Apr. 28, 1986

[51] Int. Cl.⁴ .............................................. E04B 1/47
[52] U.S. Cl. ...................................... 52/404; 52/406
[58] Field of Search ................ 52/404, 406, 743, 811, 52/407; 428/284, 285

[56] References Cited

U.S. PATENT DOCUMENTS

| | | | |
|---|---|---|---|
| 2,028,253 | 1/1936 | Spafford | 52/406 |
| 2,863,179 | 12/1958 | Gaugler | 52/406 |
| 3,647,606 | 3/1972 | Notaro | 428/285 |
| 4,323,620 | 4/1982 | Iwabuchi | 428/285 |
| 4,486,997 | 12/1984 | Roy | 52/404 |

*Primary Examiner*—Carl D. Friedman
*Attorney, Agent, or Firm*—Gregory J. Gore

[57] ABSTRACT

Thermal insulation for walls, ceilings and floors of building structures contains alternating layers of low emissivity sheets and batts of low heat conductive material laminated together to form a single insulation batt. The low heat conductive material is preferably fiberglass or rock wool. The low emissivity sheets may be a metal foil or a metal vacuum deposited on a substrate. The alternating layers are laminated together using a solvent-based pressure sensitive adhesive. Three (3) rows of the composite material can be laminated onto a common sheet so that the insulation may be installed between common wall studing, three (3) widths at a time.

6 Claims, 8 Drawing Figures

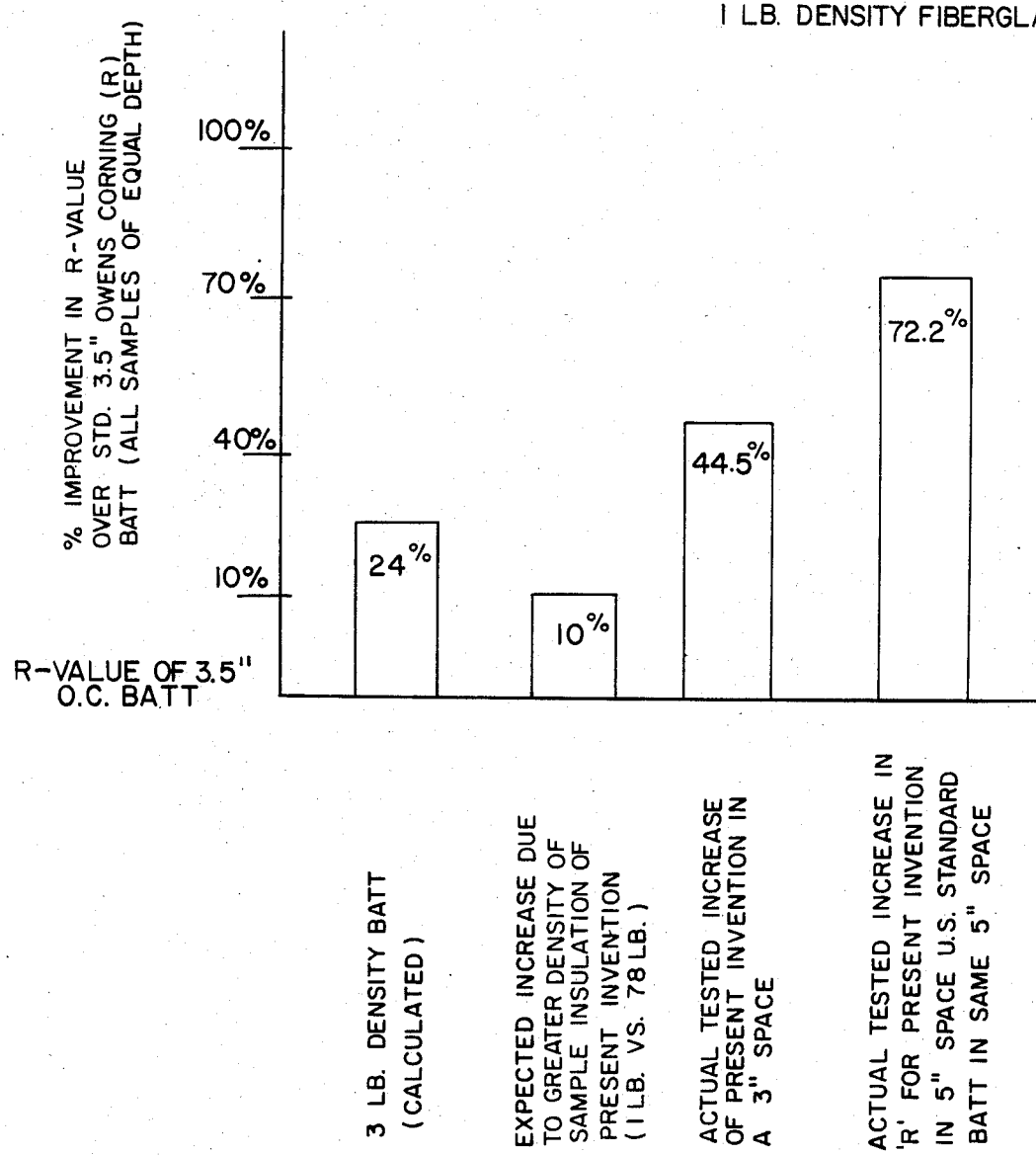

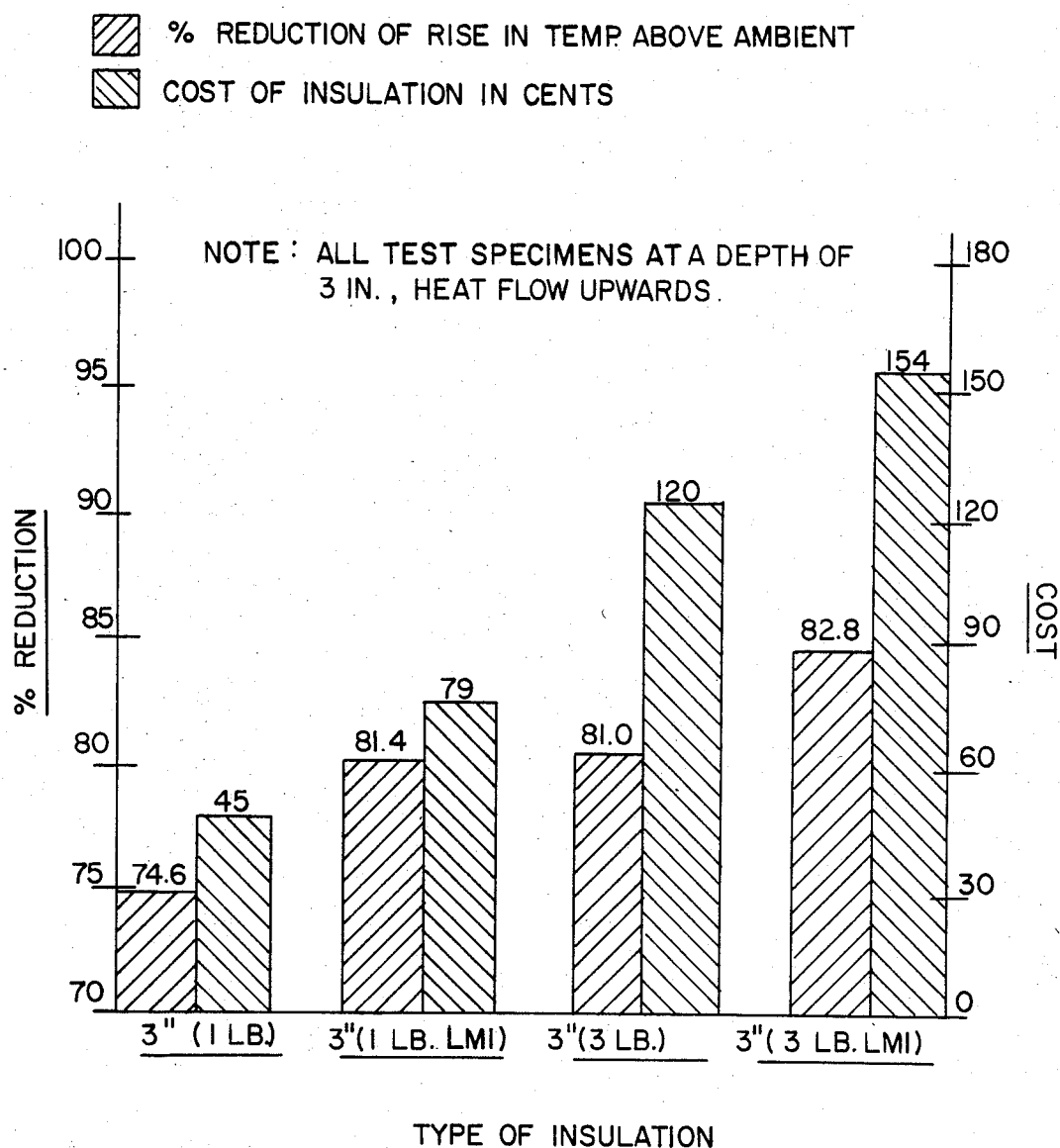

FIG. 7

| TEST NO. | DESCRIPTION | INVERSE SENSITIVITIES | HEAT FLOW (BTU/HR.FT²) | | | | THERMAL RES. (HR.FT²F/BTU) | MEAN TEMP. °F |
|---|---|---|---|---|---|---|---|---|
| | | | $Q_1$ | $Q_2$ | $Q_3$ | $\bar{Q}$ | | |
| 1 | MLI | 5 IN. | 3.45 | 3.16 | 3.63 | 3.41 | 16.26 | 100.1 |
| 2 | MLI | 3 IN. | 5.24 | 4.78 | 5.32 | 5.11 | 10.74 | 101.9 |
| 3 | MLI | 2 IN | 6.53 | 5.94 | 6.49 | 6.32 | 8.45 | 102.1 |
| 4 | MLI | 3 IN. COLD | 3.49 | 3.02 | 3.35 | 3.29 | 12.23 | 50.1 |
| 5 | MLI | 4.5 IN. | 3.49 | 3.22 | 3.64 | 3.45 | 16.51 | 102.1 |
| 6 | BATT | 5 IN. | 5.10 | 5.72 | 6.52 | 5.78 | 9.44 | 101.7 |
| 7 | BATT | 3 IN. | 7.07 | 6.45 | 7.90 | 7.14 | 7.43 | 103.5 |

TEST 1 - MLI (MULTILAYER INSULATION), 3 IN. THICK, MEASURED WITH 5 IN. SEPARATION BETWEEN THE HOT PLATE AND THE METAL DECK.

TEST 6 - BATT (BATT INSULATION) 3.5 IN. THICK MEASURED WITH 5 IN. SEPARATION BETWEEN THE HOT PLATE AND THE METAL DECK.

MULTILAYERED INSULATION BATT FOR BUILDING STRUCTURES

FIELD OF THE INVENTION

This invention relates to thermal insulation for residential or commercial building structures to provide a comfortable temperature for the occupants or objects within. This insulation material is typically installed in the exterior walls and in attic areas.

BACKGROUND OF THE INVENTION

It is known in the building construction industry to use any one of three types of insulation materials. These may be categorized by structure as being either loose fill-type, rigid panel type, or a flexible type commonly sold in blankets or batts which may be stored in rolls and cut to desired length at the installation site.

This last category, insulation batting, is the most common type used for insulating the walls and roof of home dwellings and other commercial structures. The insulation batt usually comprises a foil or kraft paper facing with a layer of low density fiberglass adhered thereto. The facing can provide a vapor barrier, a radiant energy reflector, and also a convenient means for attaching the insulation to structural components of the building. The layer of fiberglass insulation provides most of the insulating properties of the material which are generally expressed as an "R-value". The R-value is commonly dependent on a combination of either the depth of the insulation and/or its density. The thicker and more dense the insulating material, the greater its insulating capacity and hence the greater its R-value.

While numerous attempts have been made to increase the overall insulation performance in structures by using these three insulating methods, drawbacks include significantly increased cost due to the products themselves, the additional building materials required to use the products, and greater labor costs due to additional steps required in construction. The most economical form of insulation is the insulation batting or blanket. This material has the advantages of ease of handling, flexibility, fire resistance, and low cost. Unfortunately, it has a rather low R-value.

The prior art which most closely resembles the present invention is that of multiple reflective low emissivity insulation. The use of this type of insulation in the past has been restricted to very high temperature or very low temperature applications, such as cryogenics, and provides effective insulation across extreme temperature gradients. Furthermore, these prior technologies require the use of a great number of low emissivity layers, as many as 100 per inch. In addition, these insulating systems require that the space between reflective layers be evacuated in order to eliminate heat transfer by conduction or convection. Often they include a spacer material between the reflective layers in order to prevent the layers from contacting each other and thereby creating "thermal bridges". These systems have also included the insertion of radiant energy absorbing and refracting material into the evacuated space between the reflective layers in order to further reduce heat transfer by radiation. Insulating systems of this type are described in U.S. Pat. Nos. 3,124,853 and 3,151,364 to P. E. Glaser et al. Naturally, the requirements of these systems for evacuating the spaces between reflective layers is not practical for building structures.

There are some products available for building structures which utilize a number of reflective layers with an air space between the layers. However, these systems are only effective in retarding heat transfer due to radiation. Heat transfer due to conduction and convection are allowed to occur freely by movement of air molecules between the reflective layers. The relatively low R-value of these systems, along with the specialized installation techniques involved, have restricted their widespread use in building structures.

Additionally, there are insulation products which employ a single layer of low heat conductivity material, such as foam or fiberglass, along with a reflective material adhered to both sides of the low heat conductivity material. These reflective layers are used primarily as a vapor shield, although they will improve the R-value of the insulated area if used in conjunction with an adjacent air space.

One of the main benefits of the present invention is that it utilizes commonly available building materials in its construction. There is no suggestion in any prior art teachings that a multiple layering principle, which uses common fiberglass and foil materials, would be of any advantage whatsoever for thermal building insulation. In fact, the prior art teaches just the opposite. It is common practice that if one were to add additional insulating batts to existing insulation that already include a vapor shield, the vapor shield on the added batt must be removed or slashed before installing. Additionally, the prior art teaches that for a multiple-foil layer insulation to be effective, there must be an air space between the layers and that for optimum performance these spaces should be evacuated.

SUMMARY OF THE INVENTION

Although it is not fully understood, a simple laminated construction of several thin layers of batting material separated by reflective foil sheets provides a greatly improved R-value compared to similar material of exactly the same overall thickness and density. Furthermore and equally unexplained is the fact that this layering technique within a single batt of insulation shows to be a superior improvement, but primarily when applied to low density insulation. A higher density insulation in the area of 3 lb. by weight does not benefit greatly from this layering structure. The present invention comprises the use of multiple, alternating layers of foil sheeting and fiberglass batting in a unitary batt of insulation. This produces surprising and unexpected results, especially when used with fiberglass insulation in the 0.6–1.5 lb. density range as will be more fully appreciated from the charts and graphs shown below.

BRIEF DESCRIPTION OF THE DRAWINGS

FIG. 5 is a graph wherein the X-axis is the tested R-value of a standard Owens Corning(R) 3.5-inch wall insulation. The bar graphs depict the tested improvement in R-value of the test sample of the present invention, along with the calculated improvements that would be expected from 3 lb. fiberglass and the 1 lb. fiberglass used in the test sample of the present invention.

FIG. 6 is a graph depicting the percentage reduction of temperature rise above ambient, provided by the test samples along with a corresponding indication of their approximate cost per square foot.

FIG. 7 is a chart showing test results of the multilayer insulation of the present invention compared to standard batt insulation.

DESCRIPTION OF THE PREFERRED EMBODIMENT

One discovery of the present invention is that air spaces adjoining multiple reflective sheets can be replaced with low heat conductive material and retain superior resistance to radiative heat flow. A further benefit is that the system simultaneously limits heat flow by reducing conduction and convection.

Figure 1:
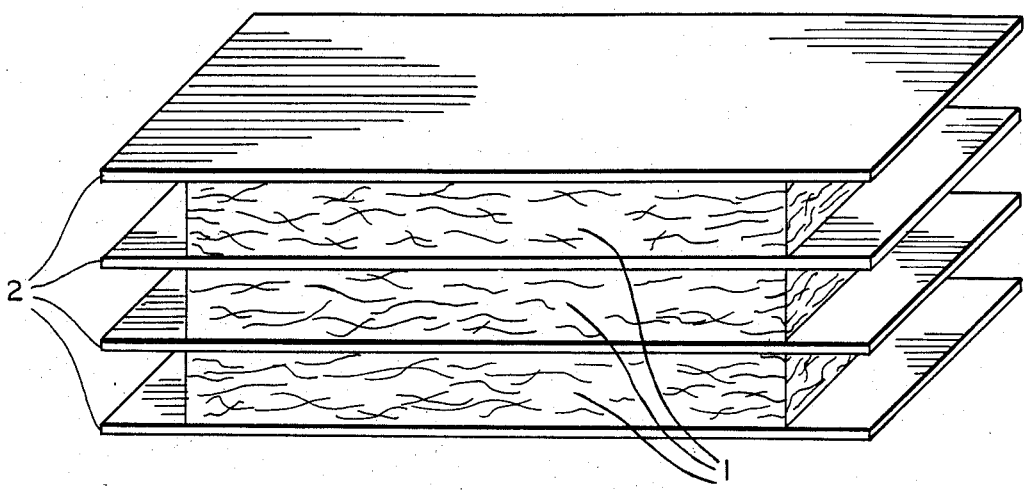
FIG. 1 is an isometric view showing the simple multilayer structure of the present invention.

Referring to FIG. 1, the preferred embodiment of the present invention is structured as shown comprising a 3-inch batt of thermal insulation of the same dimension normally inserted between the wall studding in residential housing and other commercial structures. These dimensions include the standard width of 48 inches for metal commercial buildings or 15½ inches for use with residential construction. Each insulation batt comprises at least three (3) sections, each section containing a layer of fiberglass insulation 1 with a sheet of aluminum foil 2 on at least one side. The fiberglass insulation used in the preferred embodiment is approximately 1.0 lb. density. The sections are bonded together to form a unitary batt of insulation using special laminating techniques that will be discussed below.

The reflective material chosen for use in this invention may be selected from a wide variety of metal foils, foil laminates, metallized plastic films, metallized papers or other metallized substrates where the emissivity of these reflective surfaces is in the order of 0.2 or less. The metals may include gold, silver, tin, zinc, cadmium, magnesium, chromium, antimony, platinum, copper, palladium, nickel and aluminum. These are all presently employed in the art of vacuum metallization and plating and can be obtained in the form of a foil. However, it is suggested that from a cost/performance standpoint, aluminum is the preferred metal to use either as a foil or vacuum deposited on the substrate. It should be noted that aluminum foil or vacuum deposited aluminum film can be readily obtained with an emissivity in the range of 0.03 to 0.05, which is the preferred level. For reasons discussed below, it may be advisable that the reflective material employed in this invention be provided with an anti-oxidation coating prior to lamination.

Several types of low heat conductivity materials are commercially available, including rock wool and fiberglass, among others. Fiberglass blankets are particularly suited to this invention due to their strength, resistance to heat conductivity, damage resistance, flexibility, fire resistance, and because they are readily available in a wide range of widths, depths and densities.

Because one of the prime objectives of this invention is to provide insulation which is economical, it is important to point out that while simple 3 lb. density fiberglass carries an R-value approximately 20% superior to that of 1 lb. density, its cost is generally 300% higher. Furthermore, it has been unexpectedly found in laboratory tests that not only does an insulation of the type of the current invention using 1 lb. density fiberglass possess an R-value superior to that of simple 3 lb. fiberglass, but also that there appears to be no appreciable gain in R-value by using 3 lb. density fiberglass in this invention (FIG. 6). Therefore, because this invention performs optimally with the least expensive component, the user gains an R-value superior to that of 3 lb. density fiberglass while incurring lower costs. From test results, it appears that the optimum density fiberglass for use with the present invention is in the range of 0.6 lb. to 1.5 lb.

Figure 3:
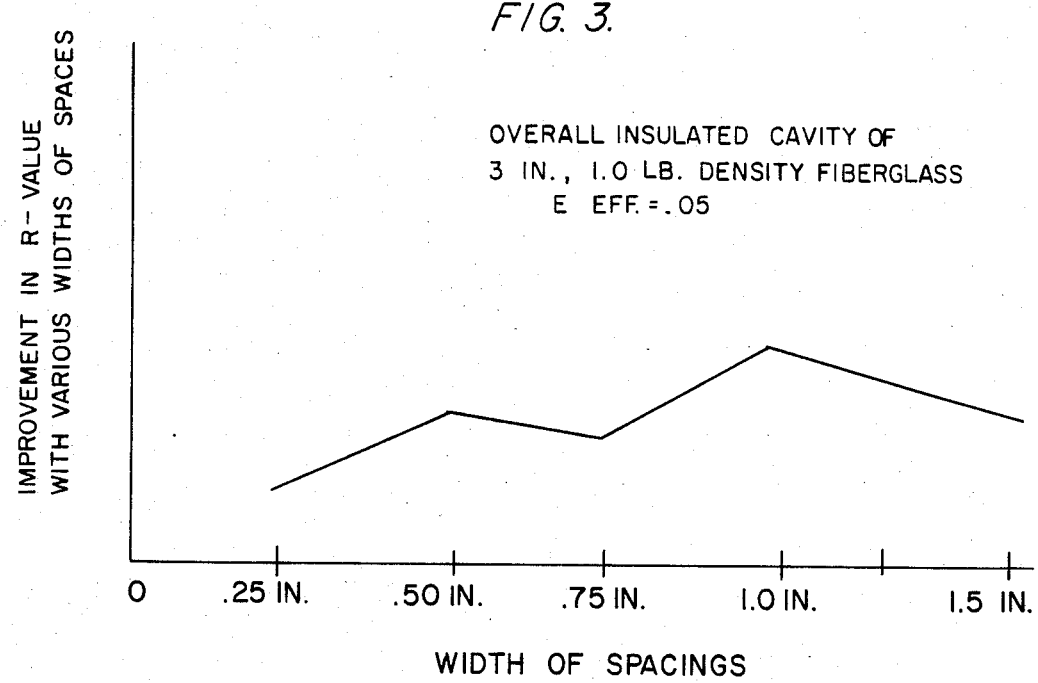
FIG. 3 is a graph showing the relationship between R-value and spacing distances between low emissivity layers within an insulating space of given dimension.
Figure 4:
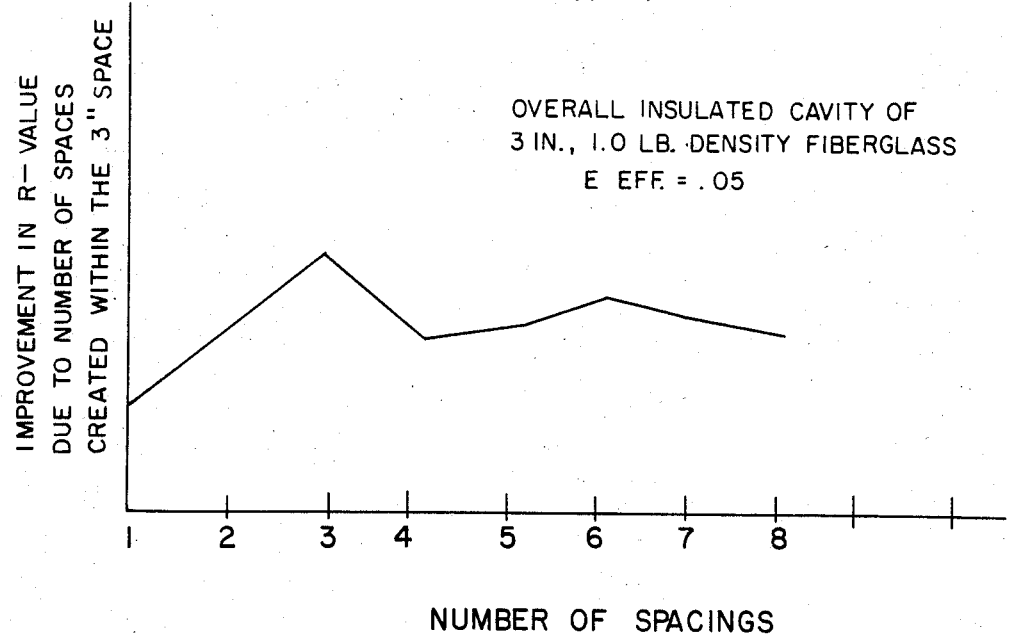
FIG. 4 is a graph showing the effect on R-value using different spacings within a insulating cavity of given dimension.

The spacing between adjacent low emissivity sheets is critical. "Spacing" as used here means the depth of the fiberglass and hence the amount of space adjacent to the reflective sheets after the insulation has been installed. This spacing may change from the insulation at rest because the insulation may be compressed during installation and the spacings thereby reduced. Spacings as low as 0.25 inches have been tested and there are situations where this spacing is appropriate, although there is a large drop-off in the performance of the system with spacings less than 0.50 inches, see FIG. 3. The optimum spacing appears to be between 0.75 inches and 2.0 inches depending upon the dimension of the insulating cavity and the R-value required. The number of sections used is equally critical and at least three sections are required to show marked improvement over existing insulation products. As many as twelve sections have been tested and the optimum number appears to vary depending upon the specific requirements of the area being insulated. For example, an insulation of the present invention designed for use in a 3-inch cavity will be optimized by alternating 3 layers of 1 inch, 1 lb. density fiberglass with 4 sheets of low emissivity material.

Figure 2:
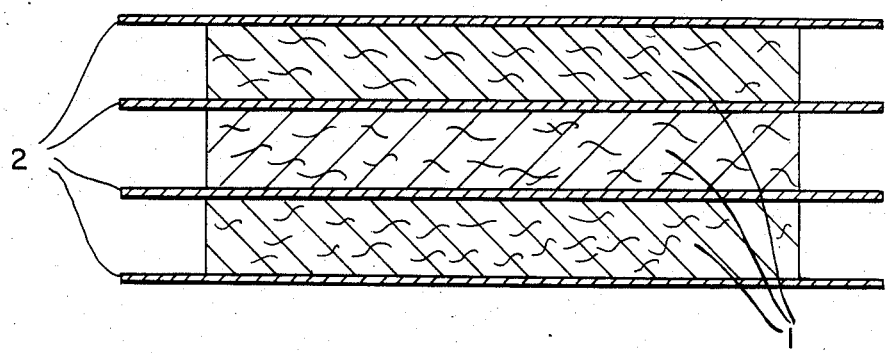
FIG. 2 is a sectional view taken from FIG. 1 showing the laminated structure of the insulation.

Independent testing of the multilayer insulation system of the present invention was conducted at the Drexel University Center for Insulation Technology in Philadelphia, Pa. FIG. 7 shows the results of these performance tests. The multilayer insulating system was compared with standard batt insulation under identical test conditions. Tests #1, 2, and 4 were done on a 3-inch batt of the present invention. Test #3 was done on a 3-inch batt of the present invention compressed to a thickness of 2 inches. Test #5 was done on a 4.5-inch batt of the present invention and test #6 and #7 were conducted for comparison purposes on a standard 3.5-inch Owens Corning(R) insulation batt. The "inverse sensitivities" indicate the dimension of the insulated cavity for each test. The multilayer insulation tested contained three layers of fiberglass insulation bounded by four sheets of aluminized mylar as shown in FIG. 2.

Using the data presented in FIG. 7, FIG. 5 shows a bar graph which summarizes the test results. The multilayered insulation system of the present invention shows a surprising performance increase over standard insulation of 44.5% when used in a 3-inch insulating cavity and a 72.2% increase over standard insulation when used in a 5-inch insulating cavity. The standard insulation, which was used for comparison in these tests, was a 3½-inch thick batt produced by Ownes Corning(R) which had a density of 0.78 lb./ft.$^3$ (at 3.5 inches).

Since delamination of the sections will occur with the use of generally accepted foil/fiberglass bonding methods which employ a "dip and roll" laminator and a water-based adhesive, it is important that the present invention be formed using specialized techniques. It has been found that a successful and relatively inexpensive method of manufacture is to use a series of unwind-nipper-rewind laminators with a solvent based, pressure sensitive adhesive applied with a series of spray heads. This avoids the high cost of "hot melt" adhesives or multiple drying ovens which would make the present invention prohibitively expensive.

Another consideration in fabricating the insulation of the present type is that of oxidation of the metal surface of the low emissivity materials due to chemical interaction with the adhesive. If allowed to occur, this oxidation will increase the effective emissivity of the sheets and thereby dramatically reduce the effectiveness of the system. A solution to this problem has been to coat the surface of the reflective material with an appropriate anti-oxidation substance prior to lamination.

It should be noted that insulation of the type of the present invention does not lend itself to a predictable straight-line calculation of R-value per inch as with most prior art insulation. Additionally, the depth of the spacings as well as the number of sections required to achieve optimization will vary with the dimension of the overall insulation cavity. For example, one cannot assume that because 1-inch spacing is the optimum for a 3-inch insulating cavity that 1-inch spacings is the optimum for a 6-inch cavity. Likewise, one cannot assume that because three sections is the optimum for the 3-inch insulating cavity that three sections is the optimum for the 6-inch cavity. It is highly recommended that the present invention be custom designed for each specific application.

By way of further describing applicant's invention, it should be noted that it has been discovered that the intermediate sheets of low emissivity foil within the composite insulation batt do not adversely affect the insulation because of their function as vapor barriers. For best performance, these sheets should remain unperforated and continuous throughout the length of the insulation batt, contrary to the teachings in the prior art.

Furthermore, it should be understood that there may be many modifications and adaptations of the specific embodiment of the present invention as described herein and still fall within the scope and spirit of the invention. It is therefore intended that the embodiment described herein not be a limitation on the scope of the invention which shall be determined by the appended claims.

Figure 8:
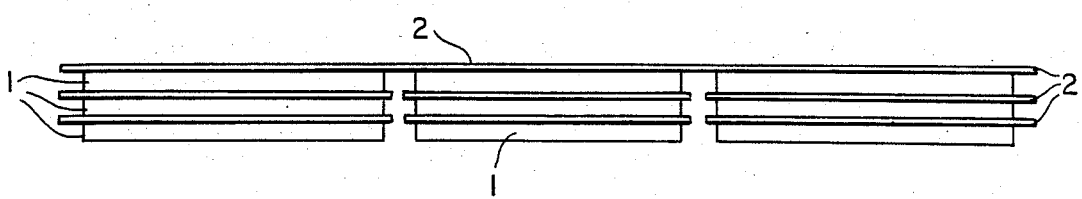
FIG. 8 is a front view of one embodiment of the present invention utilizing three separate batts mounted side-by-side on a common sheet.

For instance, three separate batts may be laminated side-by-side to a common sheet such that they may be installed between standard joists or studs three at a time. See FIG. 8.

What is claimed is:

1. In a building structure, thermal insulation located within said building walls, ceilings or floors, the improved insulation, comprising;
a unitary composite batt of thermal insulation consisting of multiple sections, each section comprising a layer of partially solid low heat-conductive material and a sheet of low emissivity material on at least one side, said composite batt containing at least three of said sections but not more than eight sections laminated together wherein said layers of low heat conductive material have a depth in the range of 0.25 inches to 2.0 inches.

2. The building insulation of claim 1 wherein the low emissivity material is a metal foil or metallized substrate with an emissivity ratio of 0.2 or less.

3. The building insulation of claim 2 further described in that the low heat-conductive material is fiberglass or rock wool of an uncompressed density of 0.6 to 1.5 lb. per cubic foot.

4. The building insulation of claim 3 further described in that said thermal insulation is in a blanket or batten form.

5. The building insulation of claim 4 wherein 3 separate batts have been laminated to a final layer side-by-side such that they can be installed between standard joists or studs, 3 at a time.

6. The thermal insulation of claim 5 further described in that low emissivity sheets are unperforated and continuous throughout the length of the insulation batt.

* * * * *